Figure 1:
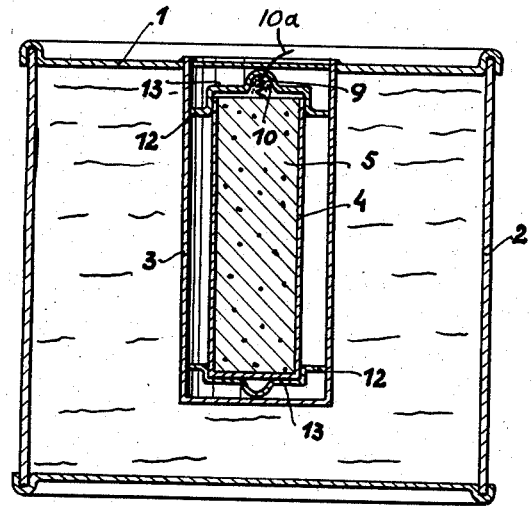

July 28, 1959   A. EDER   2,896,608
IMMERSION HEATER
Filed April 11, 1956
2 Sheets-Sheet 1

July 28, 1959  A. EDER  2,896,608
IMMERSION HEATER
Filed April 11, 1956  2 Sheets-Sheet 2
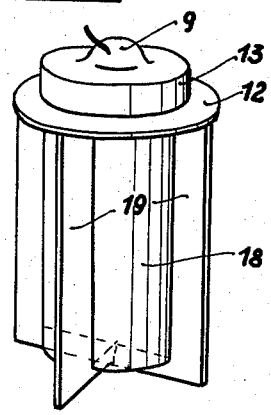
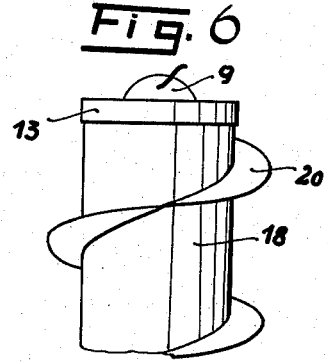
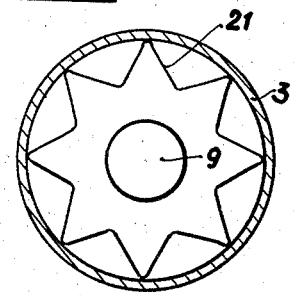
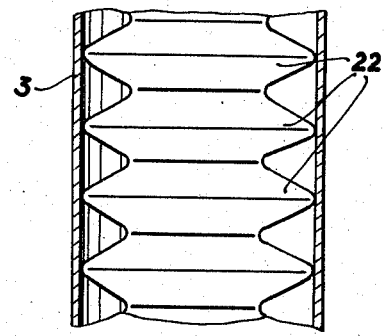
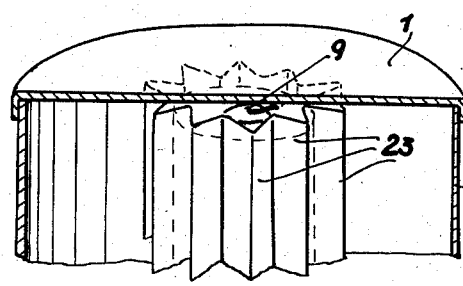

United States Patent Office 2,896,608
Patented July 28, 1959

2,896,608
IMMERSION HEATER

Adolf Eder, Linz, Austria, assignor to Etablissement EPOK, Vaduz, Liechtenstein

Application April 11, 1956, Serial No. 577,546

Claims priority, application Austria April 20, 1955

24 Claims. (Cl. 126—262)

This invention relates to an immersion heater which is particularly suitable for incorporation in food cans or tins but may also be used alone. The heater comprises a container which may be affixed to the cover of the can or tin and in which a heating cartridge is inserted which comprises a heating composition combustible without supply of air and an igniter. Since such heaters produce relatively high temperatures and the material to be heated contacts the container wall directly, because the heater is to be used as an immersion heater, care must be taken to ensure that the material to be heated will not burn on the container. It is also desired that the heat generation be as gradual as possible and that the liberated heat be stored as long as possible. Finally the manufacture of the heater should be possible in a simple manner, at low expense and with small structural expenditure because it forms an article which is spent and worthless after a single use and which must not appreciably add to the cost of the can or tin provided therewith.

All these requirements are fulfilled by the invention, which resides primarily in that the air-filled space between the container wall and the heating cartridge, which is smaller in cross-section, is subdivided into individual chambers by transverse and/or longitudinal partitions, which space the heating cartridge from the container wall so that the heating composition will not directly contact the container wall contacted on the outside by the material to be heated, and air cushions are provided which have a heat lagging effect and prevent a burning at an excessively heated point. On the other hand the partitions provide heat paths between the cartridge and the container wall so that the heat transfer to the outside is delayed but not excessively obstructed. After the air in the individual chambers has absorbed the heat it will cool only slowly so that a desirable heat storage means is provided, particularly because the partitions suppress a circulation of air.

To form transverse partitions the heating cartridge may be provided with laterally protruding flanges. In this case the cartridge can be manufactured in a particularly simple and inexpensive manner as a cylindrically rolled foil filled with the heating composition and held together by flange rings. A cover, which is formed with a cup-shaped boss adapted to receive the igniter, may be inserted at the top into the heating cartridge thus formed and the laterally bent upper edge of the foil may overlap said cover. Alternatively a cap provided with a rim flange may be mounted on the top and suitably also on the bottom of the heating cartridge, which cap may have a central cup-shaped boss for supporting the cartridge in the axial direction. The igniter is preferably embedded in the boss of the upper cap. These caps are suitable for cartridges consisting of a rolled-in foil and for cartridges made by other methods.

The heating composition may be in the form of a powder and may be filled into a sleeve or rolled-in foil. Alternatively it may consist of a compact unit of solid heating composition which is preferably of cylindrical shape and has slipped-on or inserted flange rings. The unit of heating composition may be composed of several discs of heating composition, between which flange rings are inserted. A central pin may extend through said discs of heating composition to hold them together and may protrude at the bottom. Alternatively the discs may be cemented to the flange rings. It would also be possible that the several bodies of heating composition have on one side an axially projecting pin extension, on the other side an appropriate recess, for interengagement, the flange rings being mounted on the pin extensions so that the cementing as well as the common pin for holding the bodies of heating composition together are eliminated. In addition to providing the transverse partitions the flange rings which divide the entire cartridge afford the advantage that they delay the burning down of the heating composition in steps.

If the heating cartridge consists of a rod-shaped unit of heating composition it may be desirable to insert sheet metal laminations or the like in radial longitudinal slots to form longitudinal partitions. The laminations inserted in the compact of heating composition protrude preferably downwardly and are radially extended to the center below the compact to eliminate the need for special means providing axial support.

The longitudinal and/or transverse partitions may also be provided thereby that the cartridge has inherently a shell which is provided with longitudinal or transverse ribs and in which the heating composition is filled. The cartridge shell may be of zig-zag or wave-like shape to provide the ribs or walls in a most simple manner. Instead of the flange rings, ribs or laminations the cylindrical cartridge may be provided with a helical web thereon.

In the case of a plain cylindrical cartridge the container wall is provided with inwardly projecting longitudinal or transverse ribs. In that case it is also suitable to provide said ribs by giving the container wall a zig-zag or wave-like shape. This will also afford the advantage that the outer heating surface is substantially increased.

Figure 2:
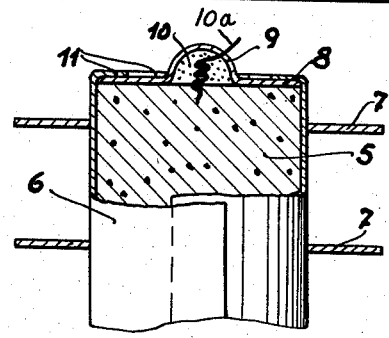
Figure 3:
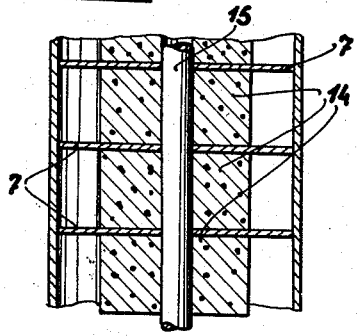
Figure 4:
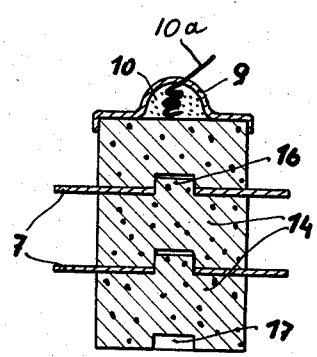

Several illustrative embodiments of the invention are shown in the accompanying drawings, in which:

Fig. 1 is an axial sectional view showing a can or tin,

Fig. 2 is an enlarged, partly sectional view showing a modified heating cartridge adapted to replace the heating cartridge of the immersion heater shown in Fig. 1, Fig. 3 is a longitudinal sectional view of a part of another type of a heater, Figs. 4 and 5 respectively are a sectional view and an elevation showing two other forms of cartridges, Figs. 6–9 show other embodiments of the heater or heating cartridge.

The cover 1 of a can or tin 2 has connected thereto a container 3 similar to an immersion heater, which has a heating cartridge inserted therein. That heating cartridge consists according to Fig. 1 of a cylindrical sleeve 4, which is filled with a heating composition 5 that will burn without supply of air. The heating cartridge may also consist of a cylindrically rolled foil 6, which is filled with heating composition 5 and held together by flange rings 7 slipped thereon (Fig. 2). The cartridge is closed at its top by a cover 8, which has a cup-shaped boss 9 for receiving the igniter 10 and is overlapped by the upper edge 11 of the foil. In the embodiment of Fig. 1 caps 13 provided with a rim flange 12 are mounted on the top and bottom of the heating cartridge. These caps have also cup-shaped bosses 9 to provide an axial support of the cartridge. The igniter 10 is embedded in the boss of the top cap and is actuated by a pull wire 10a that extends to the exterior of the can. The flange rings 7 or the rim flanges 12 form transverse partitions dividing the space between the wall of the container 3 and the heating cartridge, which is smaller in cross-section, into individual chambers.

According to Fig. 3 the heating cartridge consists of several discs 14 of heating composition, which are formed with a bore and carried together with the flange rings 7 on a pin 15 extending therethrough. The pin 15 may protrude downwardly from the cartridge to space the same from the container bottom. Instead of the provision of the pin 15 the bodies 14 of heating composition may have on one side an axially protruding pin extension 16, on the other side a corresponding recess 17 for interengagement, as is shown in Fig. 4. In that case the flange rings 7 are carried on the pin extensions 16. As is shown in Fig. 5 the heating cartridge may also consist of a rod-shaped compact unit 18 of heating composition, which has radial longitudinal slots, in which laminations 19 to form longitudinal partitions are inserted. The laminations 19 protrude downwardly and are radially extended to the center below the compact 18.

In other embodiments the cartridge is of plain cylindrical shape and provided with a helical web 20 thereon (Fig. 6) or the cartridge shell 21 is of zig-zag or wave-like shape in its longitudinal direction (Fig. 7) or formed with transverse waves 22 (Fig. 8). According to Fig. 9 a plain cylindrical cartridge may be inserted in a container shell 23 which is of zig-zag or wave-like shape in its longitudinal direction.

I claim:

1. An immersion heater comprising a sealed container and a heating cartridge having a cross-section smaller than that of the container and inserted in the latter, said heating cartridge comprising a heating composition combustible without a supply of air and an igniter in position to ignite said composition and having an activating portion extending to the exterior of said container, said heating cartridge and container defining between them a space which surrounds said cartridge and is filled with air, and partitions extending from said cartridge to said container and dividing said space into a plurality of separate chambers having substantially no air communication between them.

2. An immersion heater as set forth in claim 1, in which said partitions extend longitudinally of said cartridge and container.

3. An immersion heater as set forth in claim 1 in which said partitions extend transversely of said cartridge and container.

4. An immersion heater as set forth in claim 1 in which said partitions comprise annular flanges protruding laterally from said cartridge.

5. An immersion heater as set forth in claim 1 in which said heating cartridge comprises a cylindrically rolled foil filled with said heating composition, and flange rings holding said foil together and forming said partitions.

6. An immersion heater as set forth in claim 5, in which said heating cartridge has a top cover formed with a cup-shaped boss and said foil has a laterally bent upper rim overlapping said cover.

7. An immersion heater as set forth in claim 6, in which said boss accommodates said igniter.

8. An immersion heater as set forth in claim 1, in which said heating cartridge comprises a compact unit of solid heating composition.

9. An immersion heater as set forth in claim 8, in which said unit is of cylindrical shape.

10. An immersion heater as set forth in claim 8, in which said partitions comprise spaced flange rings projecting laterally from said unit and forming a unitary structure therewith.

11. An immersion heater as set forth in claim 8, in which said unit is composed of several discs of heating composition and said partitions comprise flange rings interposed between said discs and projecting laterally therefrom.

12. An immersion heater as set forth in claim 11, in which each of said discs has on one side an axially protruding pin extension and on the other side a corresponding recess, to enable adjacent discs to interengage said flange rings being mounted on said pin extensions.

13. An immersion heater as set forth in claim 8, in which said unit is of rodlike shape formed with radial longitudinal slots, and in which said partitions comprise laminations inserted in said slots.

14. An immersion heater as set forth in claim 13, in which said laminations protrude downwardly and are extended radially to the center below said unit.

15. An immersion heater as set forth in claim 8, which has a central pin extending axially through said unit.

16. An immersion heater as set forth in claim 15, in which said pin extends downwardly below the lower end of said unit.

17. An immersion heater comprising a sealed container having a peripheral wall and end walls and a heating cartridge enclosed in said container and smaller than the container, said cartridge and container defining between them a space which surrounds said cartridge and is filled with air, said cartridge comprising a heating composition combustible without a supply of air and an igniter in position to ignite said composition and having an activating porton extending to the exterior of said container, an end cap mounted on at least one end of said cartridge and having a central cup-shaped boss engaging an end wall of said container to space said cartridge therefrom and a rim flange engaging said peripheral wall to space said cartridge therefrom and dividing said space into a plurality of separate chambers.

18. An immersion heater according to claim 17, in which another said end cap is mounted on the opposite end of said cartridge.

19. An immersion heater, according to claim 17, in which said igniter is disposed in said boss of one said end cap.

20. A self-heating can comprising a peripheral wall and an end wall, a container positioned in said can at the end opposite said end wall and having a peripheral wall and an end wall, cover means closing the ends of both said can and said container opposite said end walls, a heating cartridge enclosed in said container and smaller than the container, said cartridge and container defining between them a space which surrounds said cartridge and is filled with air, said cartridge comprising a heating composition that is combustible without a supply of air and an igniter and an end cap mounted on said cartridge and having a central cup-shaped boss engaging said cover means and a peripheral flange engaging the peripheral wall of said container to space said cartridge from the container wall and to divide said space into a plurality of separate compartments, said igniter being disposed in said boss and having an activating portion extending through said cover means.

21. A can according to claim 20 further comprising a second cap like said end cap and mounted in like manner on the opposite end of said cartridge with the boss of said second cap engaging the said end wall of said container.

22. An immersion heater comprising a sealed container and a heating cartridge having a cross section smaller than that of the container and enclosed in the latter, said heating cartridge comprising a heating composition combustible without a supply of air and an igniter in position to ignite said composition and having an activating portion extending to the exterior of said container, said heating cartridge and container defining between them a space which surrounds said cartridge and is filled with air and partition means dividing said space into a plurality of separate air chambers having substantially no air communication between them.

23. An immersion heater according to claim 22, in which said heating cartridge comprises a shell containing said heating composition and in which said partition means comprises ribs integral with said shell.

24. An immersion heater according to claim 22, in which said partition means comprises ribs integral with said container.

References Cited in the file of this patent

UNITED STATES PATENTS

| | | |
|---|---|---|
| 95,728 | Roby | Oct. 12, 1869 |
| 287,061 | Shirley | Oct. 23, 1883 |
| 377,730 | Detwiller | Feb. 7, 1888 |
| 1,417,075 | La Cour | May 23, 1922 |
| 1,440,175 | Riabouchinski | Dec. 12, 1922 |
| 1,879,950 | Read | Sept. 27, 1932 |
| 2,020,292 | Eggert | Nov. 12, 1935 |
| 2,384,278 | Caldwell | Sept. 4, 1945 |
| 2,386,654 | Caldwell | Oct. 9, 1945 |
| 2,388,466 | Caldwell | Nov. 6, 1945 |
| 2,460,765 | Palaith | Feb. 1, 1949 |
| 2,716,977 | Loyles | Sept. 6, 1955 |
| 2,721,558 | Griffths | Oct. 25, 1955 |

FOREIGN PATENTS

| | | |
|---|---|---|
| 313,304 | Germany | July 8, 1919 |
| 443,766 | Italy | Jan. 3, 1949 |